June 12, 1945. E. J. AMBROSINI 2,377,855
BEARING ASSEMBLY
Filed Jan. 27, 1943

INVENTOR.
ELIO J. AMBROSINI.
BY Louis V. Lucia
ATTORNEY.

Patented June 12, 1945

2,377,855

UNITED STATES PATENT OFFICE 2,377,855

BEARING ASSEMBLY

Elio J. Ambrosini, Hartford, Conn., assignor of one-half to Sylvia C. Richland, Hartford, Conn.

Application January 27, 1943, Serial No. 473,707

9 Claims. (Cl. 308—191)

This invention relates to a bearing assembly and is particularly intended for the mounting of bearings, such as ball bearings, roller bearings and the like.

It is well known that in parts, such as wheels for roller skates, the wheels become worn and useless long before the bearing is affected by the use which has rendered the wheel useless. Therefore, it is particularly desirable to permit re-use of the bearing by rendering it easily detachable from the worn wheel so that it may be re-used in a new wheel. Also, where the mounting, in which the bearing is used is of particular value, it is also desirable to render the bearing itself replaceable so that the mounting may be salvaged.

The primary object of the invention is to provide an assembly in which a bearing may be detachably mounted in a member.

A further object of the invention is to provide a novel and inexpensive housing member which may be easily secured to a member for detachably supporting a bearing therein.

A further object is to provide a novel bearing assembly which is especially adapted for use in wheels for roller skates, or the like, and which will permit the removal of a frictionless bearing so that the same may be salvaged and used in a new wheel when the original wheel has become useless through wear.

Further objects of this invention will be more clearly understood from the following description and from the accompanying drawing in which.

Figure 1:
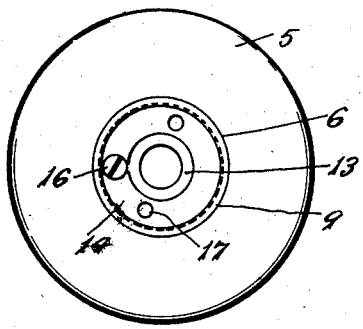
Fig. 1 is a side view of a roller skate wheel containing my improved bearing assembly.
Figure 2:
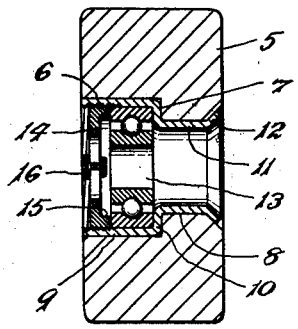
Fig. 2 is an edge view thereof in central vertical section.

As shown in the drawing, the numeral 5 denotes a member, such as a roller skate wheel, in which a bearing assembly comprising my invention is mounted. The said member is preferably provided with an opening 6 extending therethrough and having an intermediate shoulder 7. A bearing housing 8 is located within the said opening and is provided with an enlarged portion 9 forming a shoulder 10 which abuts the shoulder 7 in the opening. The said housing has a reduced portion 11 which extends through the reduced portion of the opening 6 and which is preferably flared as at 12 to secure it firmly within the said opening 6.

A bearing element 13, which may be a ball bearing or the like, is slidably mounted within the enlarged portion 9 of the housing and positioned against the inner surface of the shoulder 10. The said bearing is clamped in said position by means of a clamping plate 14 which is threaded to the inner surface of the enlarged portion 9. The said clamping plate is preferably provided with an annular shoulder 15 which abuts the outer ring of the bearing to clamp it against the inner surface of the shoulder 10 in the housing. As a means for locking the said clamping plate in clamping position, the same is preferably slit at one side thereof and provided with a threaded recess having a tapered clamping screw 16 mounted therein. The said clamping plate is also provided with tool receiving apertures 17 whereby it may be turned to its clamping position.

When the said plate has been turned in position to securely clamp the outer ring of the bearing between the annular shoulder 15 and the shoulder 10, the said screw 16 may be turned to expand the said clamping plate against the inner threaded surface in the portion 9 and thereby lock the plate in bearing clamping position.

From the above description, it will be readily understood that when a wheel or member, in which the ball bearing or the like has been used, becomes worn and it is desired to discard the same, the bearing may be easily removed therefrom and salvaged.

Figure 3:
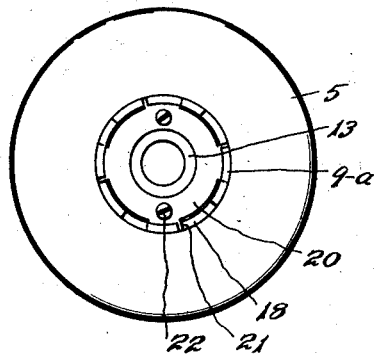
Fig. 3 is a side view of a similar wheel embodying a modified form of my invention.
Figure 4:
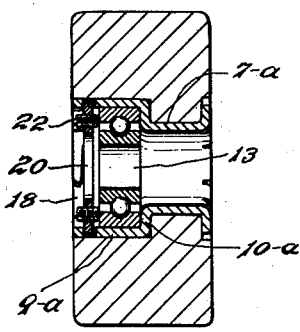
Fig. 4 is an edge view thereof in central vertical section.
Figures 5, 6:
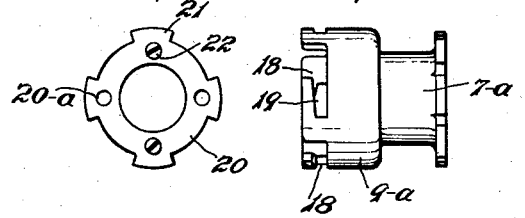
Fig. 5 is a side view of the clamping plate.
Fig. 6 is a side view of the bearing housing as used in the construction shown in Figs. 3 and 4.

In the construction shown in Figs. 3 and 4, the housing 7—a may be provided with locking means consisting of locking notches 18 formed adjacent the outer edge of the enlarged portion 9—a and having extensions 19. A clamping plate 20 is provided with extensions 21 which are received in the said notches and may be turned to fit into the extensions 19 to thereby secure said clamping plate in position. The said plate 20 is also provided with clamping screws 22 which may be forced against the outer ring of the bearing member, as clearly illustrated in Fig. 4, to clamp said ring against the inner surface of the shoulder 10—a.

It will be noted that the bearing member is clamped in such a manner that the outer ring, or raceway, is securely and rigidly held in position against the shoulder in the housing while the inner ring, or raceway, is free to rotate.

Figure 7:
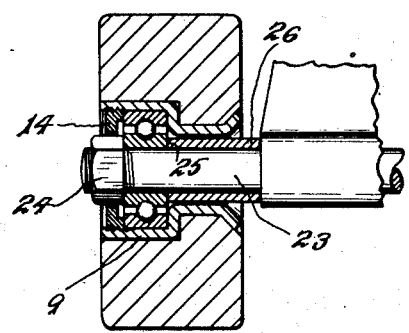
Fig. 7 is a view similar to Fig. 2 but showing the wheel mounted to an axle such as used in roller skates.

As illustrated in Fig. 7, the said bearing assembly may be mounted to an axle 23, or similar member, by securing the inner ring of the bearing thereto with a nut 24 which will secure the inner ring against a shoulder 25 that may be provided by a positioning sleeve 26 as commonly used in roller skate construction. When so mounted, the inner ring is held stationary on the axle while the entire bearing assembly is permitted to rotate thereon.

The plate 20 may be provided with openings 20—a to receive a wrench, or other suitable tool, for turning said plate when assembling it to the housing 9—a.

From the above description it will be clearly understood that my invention provides a bearing assembly in which a member supporting, or supported by, a frictionless bearing, is provided with a shoulder against which a housing may be securely positioned and the said housing is provided with means for detachably mounting the bearing therein and in such a manner that the said bearing may be readily removed for re-use while the worn part may be discarded.

My invention is also valuable wherein a frictionless bearing is mounted in an important or expensive member of a machine and wherein it may be desirable to have the bearing readily replaceable with a new one to thereby salvage the more expensive member.

It will therefore be understood that, by my invention, I have provided a simple and inexpensive bearing assembly which will render a bearing member quickly and easily detachable or interchangeable.

I claim:

1. In combination with a member comprising a bearing; said member having an opening extending therethrough with an enlarged portion forming an internal shoulder in said opening and a reduced portion extending from said shoulder to the opposite side of said member, a tubular housing mounted within said member and having a wall of substantially uniform thickness, a shoulder on said housing abutting the internal shoulder in said opening, a reduced portion in said housing extending through the reduced portion of said opening, the end of said reduced portion of the housing being flared outwardly and seated against the bottom of a recess in surrounding said opening for securing said housing in said member with the shoulder thereon in abutment with the internal shoulder in said opening, a bearing detachably mounted in said housing, and means for securing said bearing therein.

2. In a bearing assembly, a tubular housing having a wall of substantially uniform thickness and an enlargement providing an external shoulder and an internal shoulder, the said housing being secured within an opening in a member by abutment of said external shoulder against an annular shoulder in said opening, a bearing member abutting said internal shoulder, and means for clamping said bearing member against said internal shoulder.

3. In a bearing assembly, a tubular housing having a wall of substantially uniform thickness with a portion of said wall extending radially and providing an internal shoulder at one side thereof and an external shoulder at directly the opposite side thereof adapted to abut a shoulder within an opening in a separate member, a bearing element mounted within said housing and abutting said internal shoulder, and a clamping member for detachably clamping said bearing element against said shoulder.

4. In a member having a bearing mounted therein, a bearing assembling comprising a tubular housing having a wall of single thickness and an enlargement forming an intermediate wall portion, a bearing member positioned within said enlargement against said internal shoulder, and clamping means detachably secured to said housing for clamping said bearing against said internal shoulder.

5. A bearing assembly including a tubular housing having a wall of substantially uniform thickness formed to provide an enlarged portion and a reduced portion, with an intermediate wall portion forming on the opposite sides thereof an internal bearing supporting shoulder at one side and an external shoulder at the other side of said wall portion for securing said housing to a member, a bearing member contained within said enlarged portion, and means for clamping said bearing member against said internal shoulder.

6. In a bearing assembly of the character described, a tubular housing having a wall of substantially uniform thickness; a portion at one end of said housing being enlarged and connected to the remaining portion of said housing by an intermediate wall portion extending perpendicular to the axis of said housing; said intermediate wall portion providing on one side thereof an inner shoulder within said enlarged portion for supporting a bearing member mounted therein and on the opposite side an outer shoulder surrounding said housing for abutting a shoulder within an opening in a member.

7. A bearing assembly of the character described including a tubular housing having a wall of substantially uniform thickness, and an enlargement in said housing forming a cup-shaped portion; the bottom of said cup-shaped portion providing on the opposite sides thereof an external shoulder for securing said housing within a member and an internal shoulder for supporting a bearing mounted within said enlargement.

8. In a bearing assembly of the character described, a tubular housing having a wall of substantially uniform thickness and including an enlarged portion, a reduced portion, and an intermediate radially extending wall portion providing on one side thereof an external shoulder for securing said housing to a member and on the opposite side an internal shoulder for positioning a bearing member mounted within said enlarged portion.

9. A bearing assembly of the character described including a member having an opening extending therethrough, a tubular housing having a wall of substantially uniform thickness, an enlargement in said housing forming a shoulder abutting a shoulder within said opening, a bearing mounted within said enlargement, and a flared portion in said housing fitting within a recess surrounding said opening for securing said housing to said member.

ELIO J. AMBROSINI.